(12) United States Patent
Yajima et al.

(10) Patent No.: US 8,281,177 B2
(45) Date of Patent: Oct. 2, 2012

(54) DISTRIBUTED CONTROL SYSTEM

(75) Inventors: Hideharu Yajima, Tokyo (JP); Satoshi Kitamura, Tokyo (JP); Senji Watanabe, Tokyo (JP); Masafumi Kisa, Tokyo (JP); Kazushi Sakamoto, Tokyo (JP); Hiroyuki Takizawa, Tokyo (JP); Kuniharu Akabane, Tokyo (JP); Yoshinori Kobayashi, Tokyo (JP); Kenji Habaguchi, Tokyo (JP); Kiyotaka Kozakai, Tokyo (JP); Mitsuhiro Kurono, Tokyo (JP); Hiroaki Nakajima, Tokyo (JP); Takeshi Hongo, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 371 days.

(21) Appl. No.: 12/700,132

(22) Filed: Feb. 4, 2010

(65) Prior Publication Data

US 2010/0198363 A1 Aug. 5, 2010

(30) Foreign Application Priority Data

Feb. 5, 2009 (JP) ................................. 2009-025112

(51) Int. Cl.
*G06F 1/12* (2006.01)

(52) U.S. Cl. .......................... 713/400; 713/500; 713/503

(58) Field of Classification Search ........................ None
See application file for complete search history.

(56) References Cited

U.S. PATENT DOCUMENTS

| 5,530,846 A * | 6/1996 | Strong ........................... 713/400 |
| 2005/0180466 A1 * | 8/2005 | Franchuk et al. ............. 370/503 |
| 2009/0086766 A1 * | 4/2009 | Gotz et al. .................... 370/503 |
| 2010/0305740 A1 * | 12/2010 | Kent et al. ..................... 700/110 |

FOREIGN PATENT DOCUMENTS

| JP | 2001-223726 A | 8/2001 |
| JP | 2006-276958 A | 10/2006 |
| JP | 2008-042411 A | 2/2008 |
| JP | 2008-064474 A | 3/2008 |

OTHER PUBLICATIONS

Japanese Office Action dated Jan. 31, 2011, issued in corresponding Japanerse Patent Application No. 2009-025112.

* cited by examiner

*Primary Examiner* — Dennis M Butler
(74) *Attorney, Agent, or Firm* — Westerman, Hattori, Daniels & Adrian, LLP

(57) ABSTRACT

There is provided a distributed control system including a plurality of field controllers which are connected through a control network. Each of the field controllers includes: a control clock that defines a control timing of the field controller; and an adjustment unit that adjusts a control time of the control clock depending on a network time obtained through the control network.

4 Claims, 5 Drawing Sheets

DISTRIBUTED CONTROL SYSTEM

This application claims priority from Japanese Patent Application No. 2009-025112, filed on Feb. 5, 2009, the entire contents of which are incorporated by reference herein.

BACKGROUND OF THE INVENTION

1. Technical Field

The present disclosure relates to a distributed control system. More particularly, the present disclosure relates to a distributed control system in which a plurality of field controllers are connected through a control network.

2. Related Art

In a distributed control system that controls field devices in a plant through field controllers disposed in the plant in a distributed manner, a plurality of devices such as an engineering station, an operation monitor and field controllers are connected to each other through a control network. Among a plurality of field controllers, the process data of the other field controllers can be received by way of the control network and the received data can be used for their own control computations. Such a control computation (control scan) is executed in a given cycle at each field controller (see e.g., JP-A-2006-276958).

The control computation of the field controller is started once the power is turned on. For this reason, when a plurality of field controllers are present, the timing of the control computation of each field controller depends on the timing of power-on.

If the timing of the control computation can be made the same among the field controllers, the overall computation speed can be increased and stable control can be performed. Therefore, it is considered to execute the control computations of all the field controllers in synchronism with one another in accordance with the network time. However, at the same time, in the control computations of the field controllers, continuity of each control computation is also required. For example, when a momentary power failure occurs at a specific field controller, it is necessary to resume the control computation from where it is halted, after the power is restored. However, when the control computation is executed in accordance with the network time, such continuity of the control computation is lost.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an illustrative aspect of the present invention to provide a distributed control system in which the simultaneity and the continuity of the control computations at a plurality of field controllers can both be achieved.

According to one or more illustrative aspects of the present invention, there is provided a distributed control system including a plurality of field controllers which are connected through a control network. Each of the field controllers includes: a control clock that defines a control timing of the field controller; and an adjustment unit that adjusts a control time of the control clock depending on a network time obtained through the control network.

Other aspects of the invention will be apparent from the following description, the drawings and the claims.

DETAILED DESCRIPTION OF EXEMPLARY EMBODIMENTS

Hereinafter, exemplary embodiments of the distributed control system according to the present invention will be described with reference to the drawings.

Figure 1:
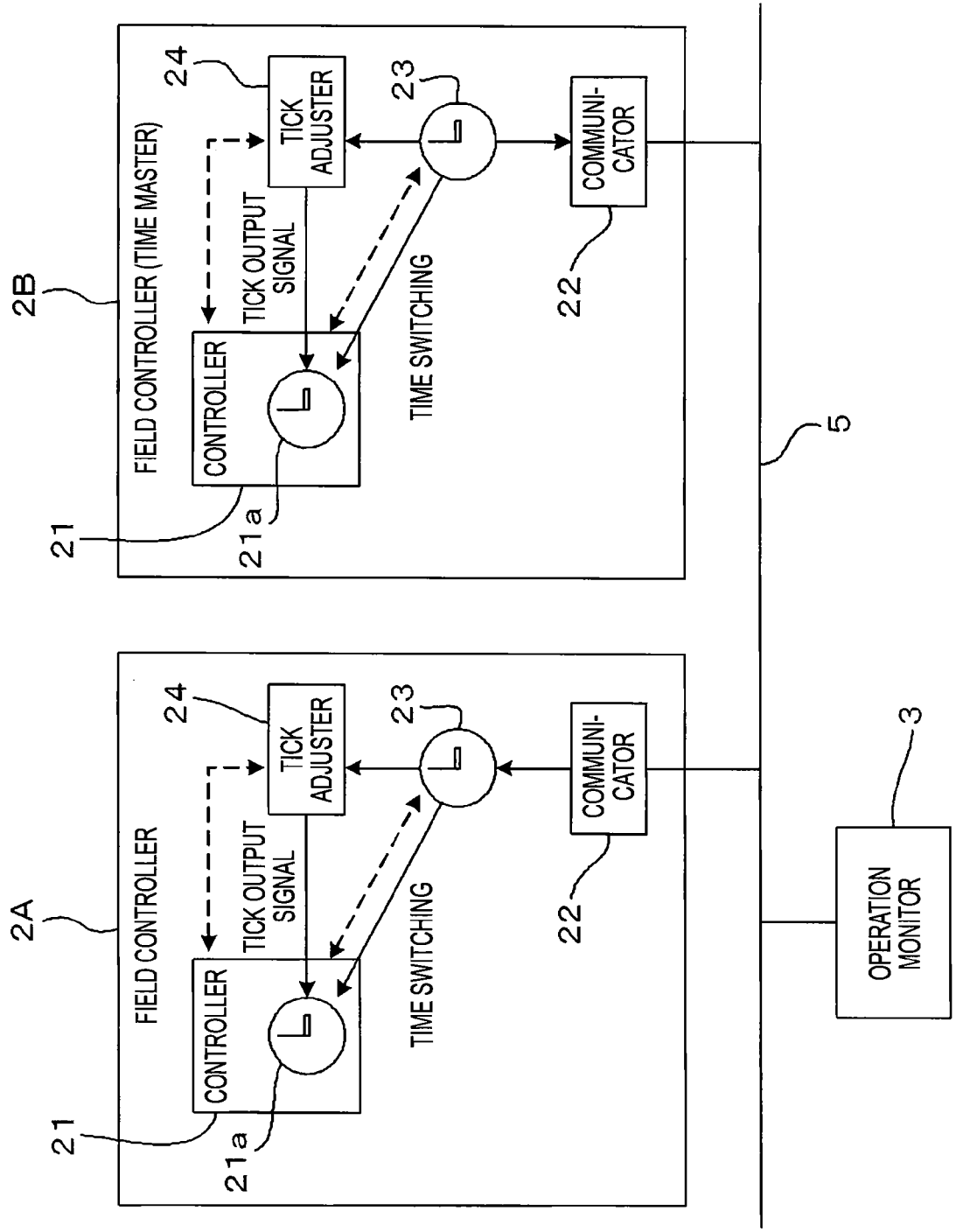
FIG. 1 is a block diagram showing the configuration of a distributed control system according to an embodiment of the invention.

FIG. 1 is a block diagram showing the configuration of a distributed control system according to the present embodiment of the invention.

As shown in FIG. 1, the distributed control system includes: field controllers 2A, 2B, . . . disposed in a plant in a distributed manner; and an operation monitor 3 that operates and monitors a field device group in the plant through the field controllers 2A, 2B, . . . . The field controllers 2A, 2B, . . . and the operation monitor 3 are interconnected by a control network 5.

As shown in FIG. 1, each of the field controllers 2A, 2B, . . . includes: a controller 21 having the function of field control; a communicator 22 having the function of communication through a communication bus 5; a network clock 23 for managing the network time; and a tick adjuster 24 that supplies a Tick (timer clock) signal to a control clock 21a that defines the control timing of the controller 21.

In FIG. 1, the field controller 2B functions as a time master, and the network time of the devices connected to the control network 5 is set based on the network clock 23 of the field controller 2B. The time (network time) of the network clock 23 of the field controller 2B is transmitted through the control network 5 by the communicator 22 of the field controller 2B. The other devices such as the field controller 2A connected to the control network 5 advances its own network clock based on the network time received through the control network 5.

Figure 2:
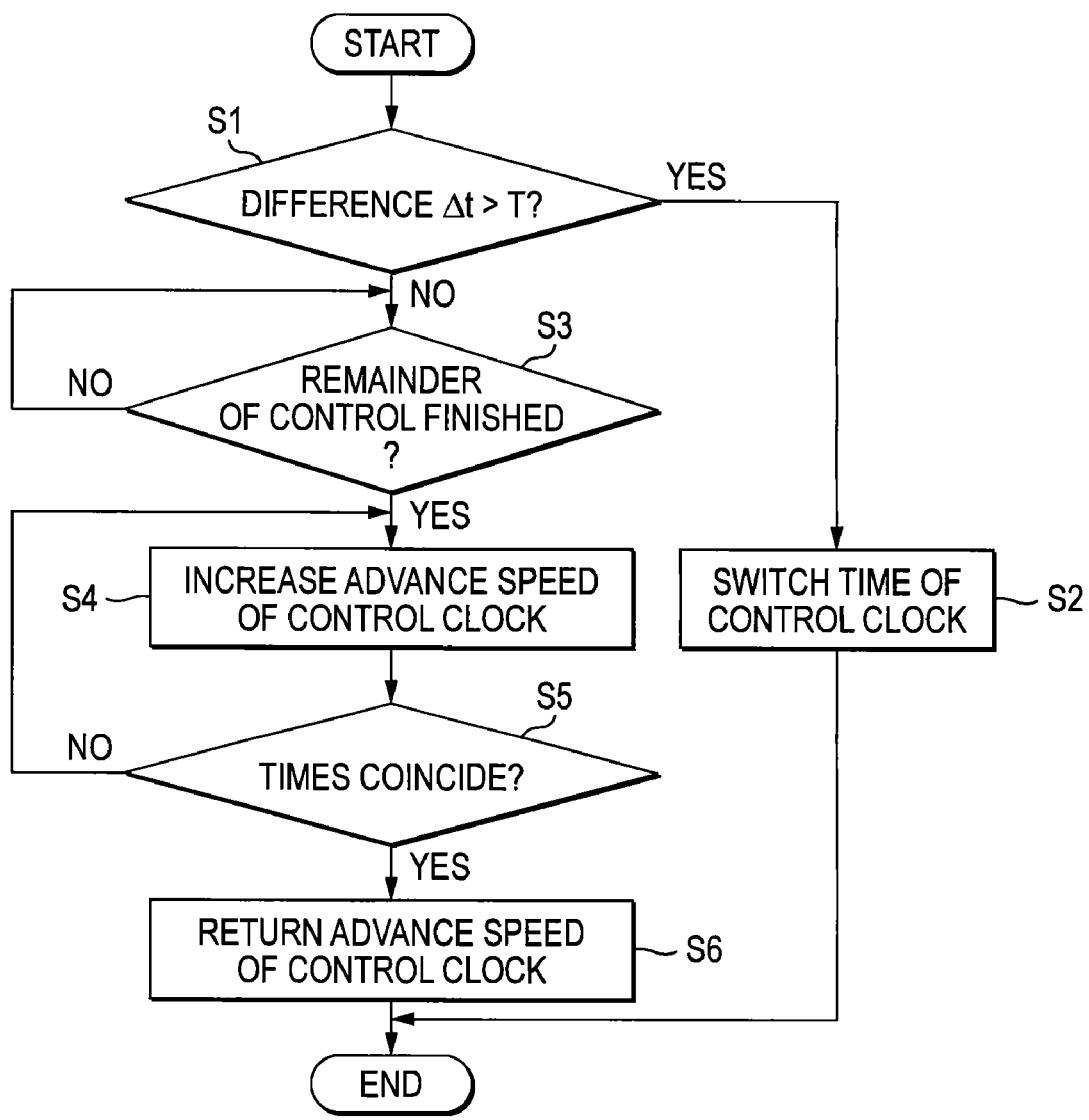
FIG. 2 is a flowchart showing the procedure of the adjustment of a control clock.

FIG. 2 is a flowchart showing the procedure of the adjustment of the control clock 21a in the controller 21 of the field controller 2A at the time of activation of the field controller 2A. The procedure of FIG. 2 is started, for example, when the field controller 2A whose operation is halted by a power failure is activated due to power restoration. When a power failure or the like occurs, the control clock 21a of the field controller 2A stops. On the other hand, there is a case where the time counting by the network clock 23 continues since communication continues. Thus, there is a possibility that a difference occurs between the control clock 21a and the network clock 23 at the time of power restoration. With the following procedure, such a difference between clocks can be resolved:

At step S1 of FIG. 2, when the field controller 2A is activated due to power restoration, the time indicated by the control clock 21a of the field controller 2A and the time indicated by the network clock 23 of the field controller 2A are compared with each other. Then, it is determined whether the difference Δt between them is larger than a threshold value T or not. If YES at step S1, the process goes to step S2. On the other hand, if NO at step S1, the process goes to step S3.

At step S2, the control clock 21a is advanced such that the time indicated by the control clock 21 coincides with the time indicated by the network clock 23 (time switching), and the process is ended. In this case, the controller 21 does not continuously execute the remainder of the control halted before the power failure, but executes a new control scan from the beginning according to the timing generated by the control clock 21a. Moreover, the control clock 21a is supplied with a tick signal obtained from the network clock 23.

On the other hand, at step S3, the controller 21 continuously executes the remainder of the control halted before the power failure, and after waiting until the remainder of the control is finished, the process goes to step S4.

At step S4, the signal supplied to the control clock 21a is changed to the tick signal obtained by the network clock 23 from a tick output signal obtained by the tick adjuster 24. Thereby, the advance speed of the control clock 21a is increased, and the cycle of the control scan (control cycle) is reduced. In this case, the controller 21 continuously executes the remainder of the control halted before the power failure, and shifts to a new control scan in the next operation cycle.

Then, at step S5, the time indicated by the control clock 21a of the field controller 2A and the time indicated by the network clock 23 of the field controller 2A are compared with each other. Then, it is determined whether both of them coincide with each other or not. If YES at step S5, the process goes to step S6. On the other hand, if NO at step S5, step S4 is repeatedly performed.

At step S6, the signal supplied to the control clock 21a is returned to the tick signal obtained by the network clock 23, and then the process is ended. Thereby, the advance speed of the control clock 21a is returned to the original speed, and then the control cycle is returned to the normal length.

Figure 3:
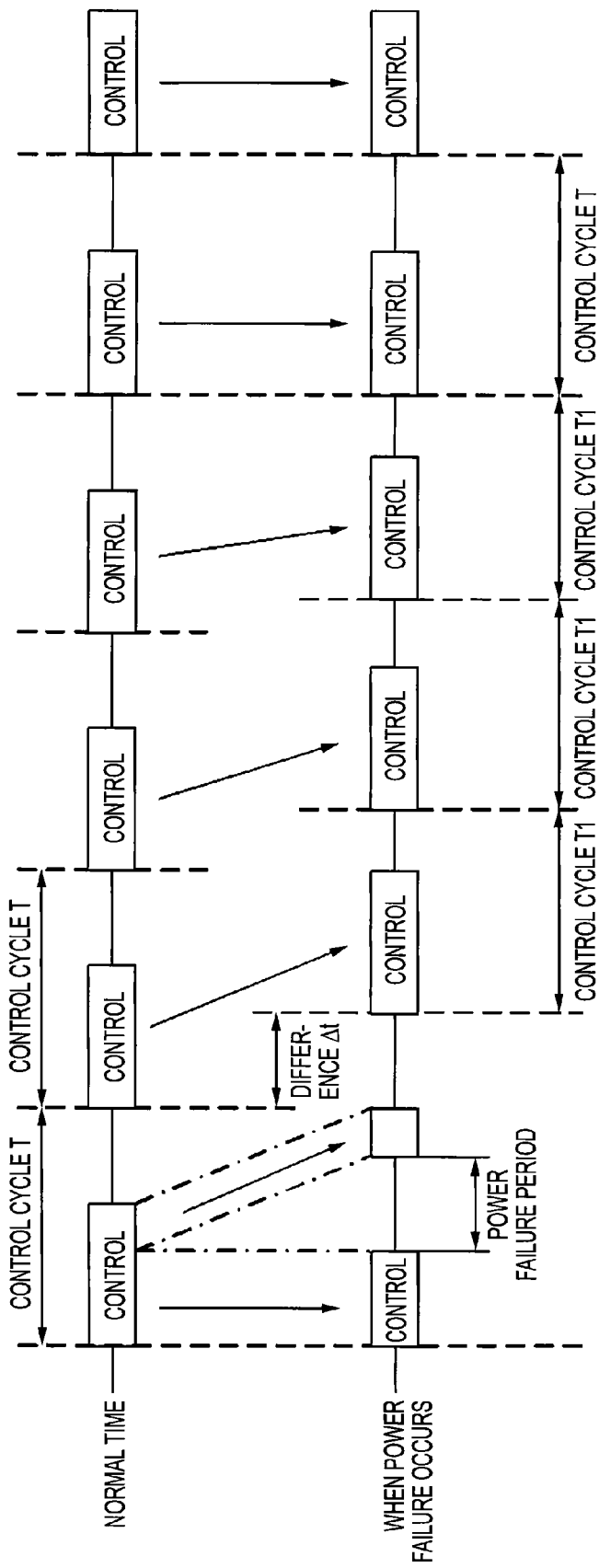
FIG. 3 is a view showing a state where the timings of control scans are synchronized by changing a control cycle.

FIG. 3 is a view showing a state where the timings of control scans are synchronized by changing the control cycle.

As shown in FIG. 3, when the difference Δt between the time indicated by the control clock 21a and the time indicated by the network clock 23 is not larger than the threshold value T (i.e., YES at step S1), after the power failure period is ended, the remainder of the halted control is executed (step S3).

After the power restoration, since the control cycle is T1 that is shorter than the original control cycle T, the timing of the control scan gradually advances and overtakes the control condition of a case where there is no power failure. When the time indicated by the control clock 21a and the time indicated by the network clock 23 coincide with each other, the control cycle is returned to the original control cycle T (step S6). In this manner, the control timing can be made the same as those of the other devices connected to the control network 5.

Figure 4:
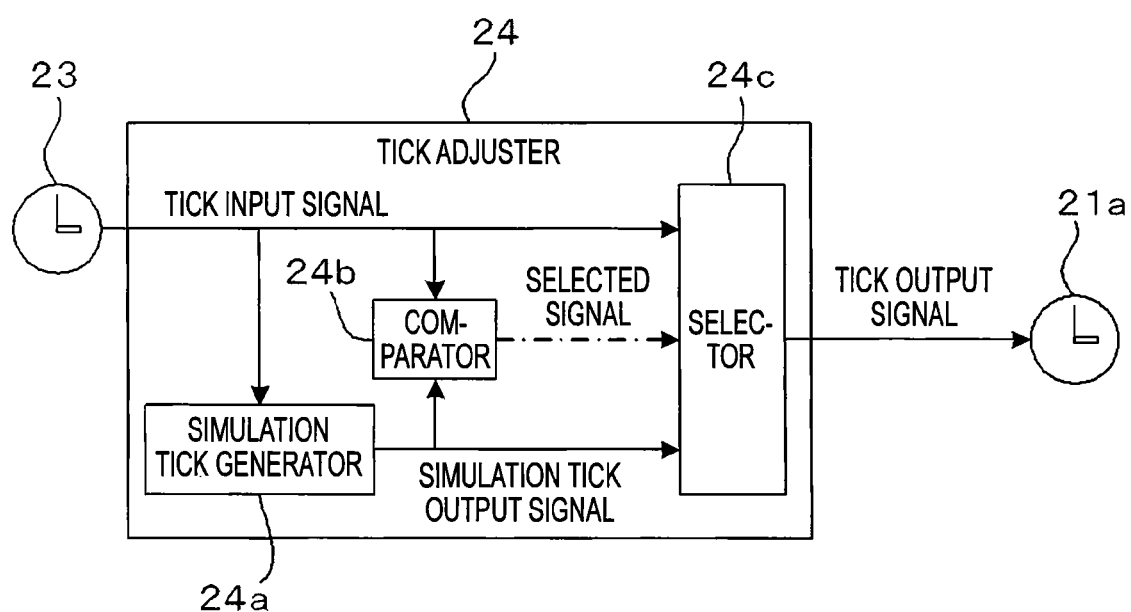
FIG. 4 is a block diagram showing an example of the configuration of a tick adjuster.

FIG. 4 is a block diagram showing an example of the configuration of the tick adjuster 24.

In this example, the tick adjuster 24 includes: a simulation tick generator 24a that receives the tick input signal from the network clock 23 so as to generate a simulation tick output signal having a frequency higher than that of the tick input signal; a comparator 24b for detecting the phase difference between the tick input signal and the simulation tick output signal; and a selector 24c that selects one of the tick input signal and the simulation tick output signal as the signal supplied to the control clock 21a.

Figure 5:
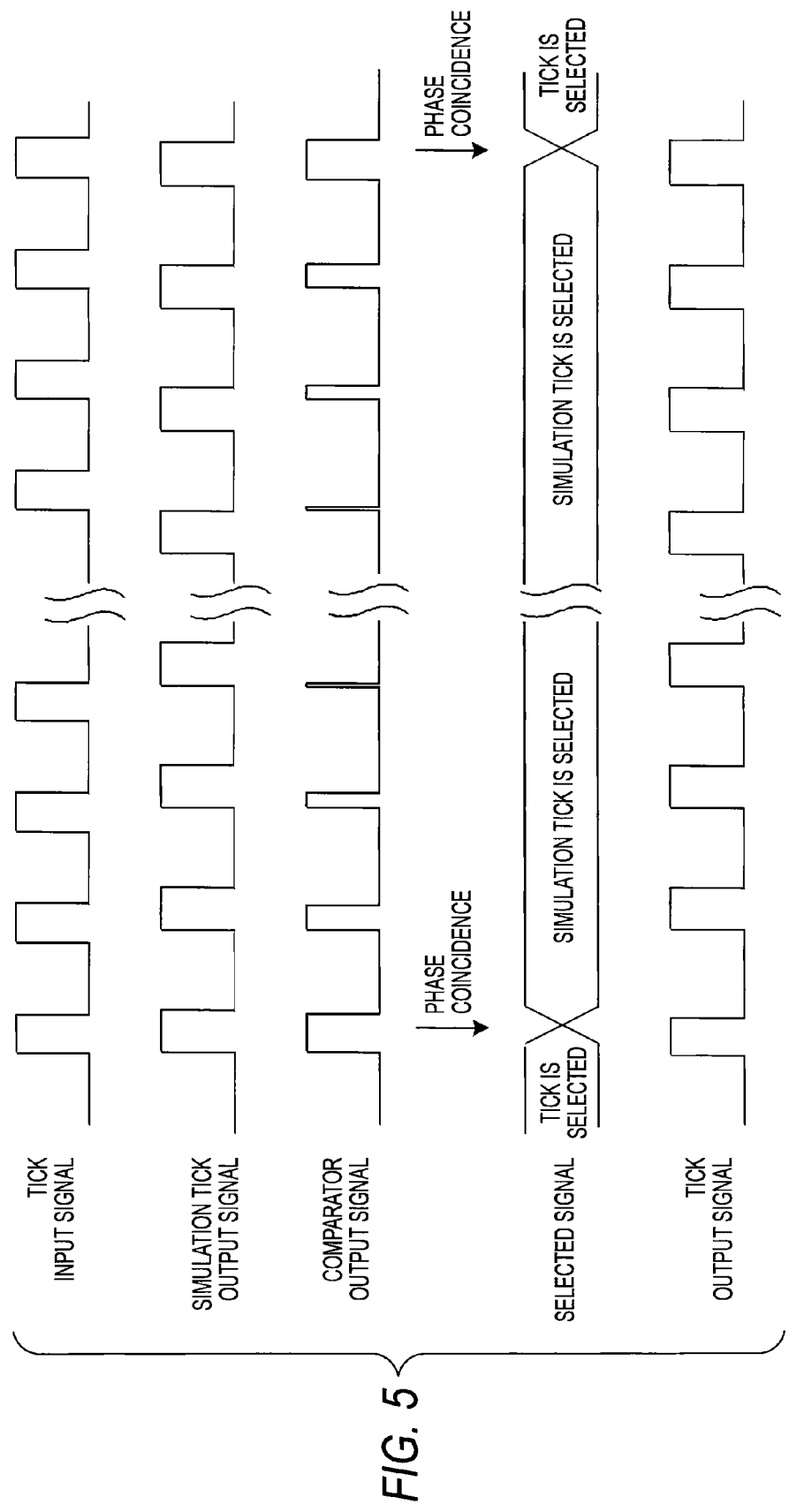
FIG. 5 is a timing chart showing the operation of the tick adjuster.

FIG. 5 is a timing chart showing the operation of the tick adjuster 24 when switching is made between the tick input signal and the simulation tick output signal as the signal supplied to the control clock 21a.

As shown in FIG. 5, the comparator 24b switches the selected signal supplied to the selector 24c, at the time when the phases of the tick input signal and the simulation tick output signal coincide with each other. Consequently, the waveform of the tick output signal is not disturbed when the frequency is changed, so that the advance speed of the control clock 21a can be smoothly adjusted.

When the control clock is ahead of the network clock, by increasing the control cycle such that it is larger than the original cycle, the control timing can be adjusted.

The range of the change of the control cycle may be, for example, about 0.5% of the original control cycle T.

As described above, according to the distributed control system of the present embodiment, since a plurality of field controllers can be synchronized with the network time, control fluctuations among the field controllers can be suppressed, so that stable control processing can be continued. In particular, the control timing can be synchronized with the network time while the continuity of the control computation is maintained when the difference between the times of the control clock and the network clock is small. Thus, the present embodiment is advantageous in a case where the continuity of control at the time of the restoration from a power failure is required.

While, in the present embodiment, there has been described a case where the control clock is adjusted after activation, the present invention is widely applicable to a case where a difference occurs between the control clock and the network clock for some reason or other.

Moreover, while an example is shown in which the field controller 2B is used as the time master, any device connected to the control network can be used as the time master.

Moreover, the present invention is also applicable to a case where field controllers are duplexed. In this case, a control clock may be provided to each of the two devices (CPUs) that function as the control side and the standby side.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A distributed control system in which a plurality of field controllers are connected through a control network, the system comprising:

an internal control clock generator provided in each of the field controllers and generating a cyclic internal timer clock signal to define a control timing of the field controller, an internal time being represented by the internal clock signal;

an output unit that outputs a cyclic network timer clock signal to the control network, a network time being represented by the network timer clock signal; and an adjustment unit provided in each of the field controllers and synchronizing the internal time with the network time while maintaining continuity of the internal time by detecting a time difference between the internal time and the network time based on a comparison result between a waveform of the internal timer clock signal of the field controller and a waveform of the network timer clock signal obtained through the control network and controlling a cycle of the internal timer clock signal such that the time difference is reduced, wherein if the time difference between the internal time and the network time is smaller than a threshold value, the adjustment unit changes the cycle of the internal timer clock signal so as to synchronize the internal time with the network time while maintaining the continuity of the internal time, and if the time difference is larger than the threshold value, the adjustment unit discontinuously switches the internal time to the network time.

2. A distributed control system in which a plurality of field controllers are connected through a control network, the system comprising:

an internal control clock generator provided in each of the field controllers and generating a cyclic internal timer clock signal to define a control timing of the field controller, an internal time being represented by the internal clock signal;

an output unit that outputs a cyclic network timer clock signal to the control network, a network time being represented by the network timer clock signal; and an adjustment unit provided in each of the field controllers and synchronizing the internal time with the network time while maintaining continuity of the internal time by detecting a time difference between the internal time and the network time based on a comparison result between a waveform of the internal timer clock signal of the field controller and a waveform of the network timer clock signal obtained through the control network and controlling a cycle of the internal timer clock signal such that the time difference is reduced, wherein the adjustment unit switches the cycle of the internal timer clock signal with timing that causes no phase difference, when the adjustment unit changes the cycle of the internal timer clock signal.

3. The distributed control system according to claim 1, wherein the internal control clock generator outputs the network timer clock signal as the internal timer clock signal after the time difference between the network time and the internal time has disappeared.

4. The distributed control system according to claim 3, wherein the internal control clock generator outputs the network timer clock signal as the internal timer clock signal after the time difference between the network time and the internal time has disappeared.

* * * * *